(12) United States Patent
Englander

(10) Patent No.: US 7,798,659 B2
(45) Date of Patent: Sep. 21, 2010

(54) VEHICLE MIRROR HAVING A LIGHT SOURCE

(75) Inventor: Benjamin Englander, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 813 days.

(21) Appl. No.: 11/692,444

(22) Filed: Mar. 28, 2007

(65) Prior Publication Data
US 2007/0229961 A1    Oct. 4, 2007

Related U.S. Application Data

(60) Provisional application No. 60/786,653, filed on Mar. 28, 2006.

(51) Int. Cl.
G02B 7/182 (2006.01)
(52) U.S. Cl. .................................. 359/871; 359/843
(58) Field of Classification Search ................. 359/604, 359/838, 871, 843
See application file for complete search history.

(56) References Cited

U.S. PATENT DOCUMENTS

| | | | |
|---|---|---|---|
| 4,436,372 A | 3/1984 | Schmidt et al. | |
| 4,822,157 A | 4/1989 | Stout | |
| 4,938,578 A | 7/1990 | Schmidt et al. | |
| 5,084,785 A | 1/1992 | Albers et al. | |
| 5,525,430 A | 6/1996 | Chahroudi | |
| 5,576,899 A | 11/1996 | Englander | |
| 5,708,522 A | 1/1998 | Levy | |
| 6,328,450 B2 | 12/2001 | Englander | |
| 6,700,692 B2 | 3/2004 | Tonar et al. | |
| 2005/0179527 A1* | 8/2005 | Schofield | 340/435 |
| 2005/0180032 A1* | 8/2005 | Seguchi et al. | 359/838 |

* cited by examiner

Primary Examiner—Joshua L Pritchett
(74) Attorney, Agent, or Firm—Wilmer Cutler Pickering Hale and Dorr LLP

(57) ABSTRACT

A vehicle mirror comprises a lens, a reflective member disposed so as to receive light from the lens, and a support disposed so as to support the lens and the reflective member. A control system is connected to the reflective member and is effective to control the reflection of the reflective member. Various techniques are disclosed to control the reflection including the use of photochromic coatings, LCDs, and motor control assemblies.

12 Claims, 6 Drawing Sheets

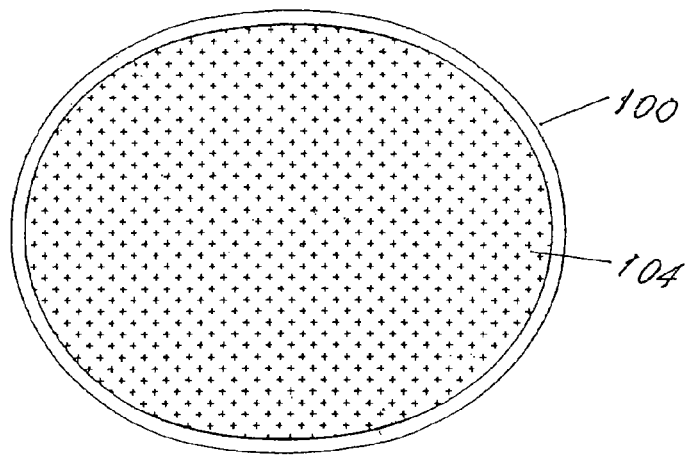
FIG. 5a
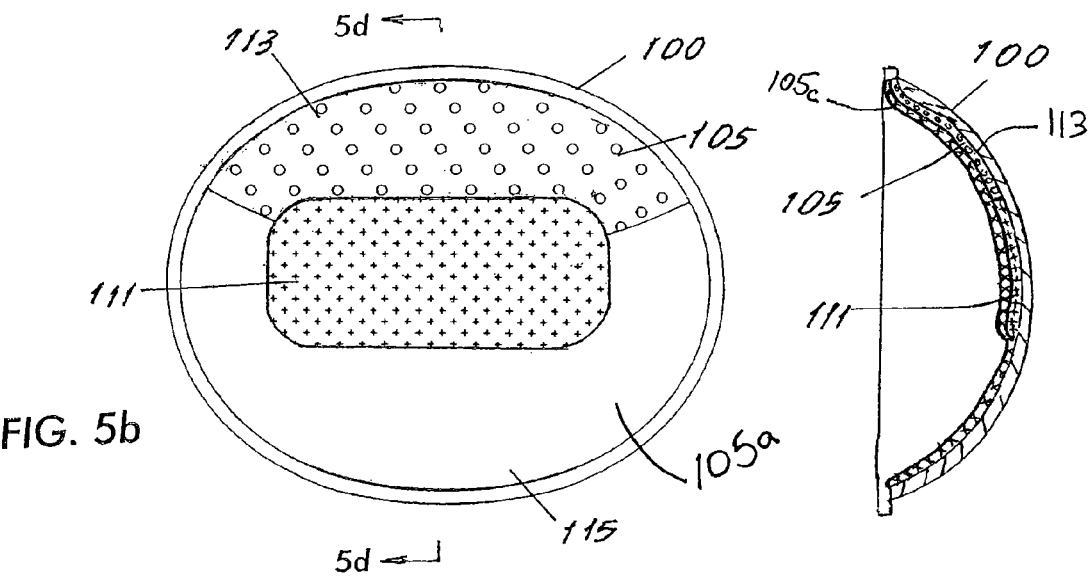
FIG. 5b
FIG. 5d
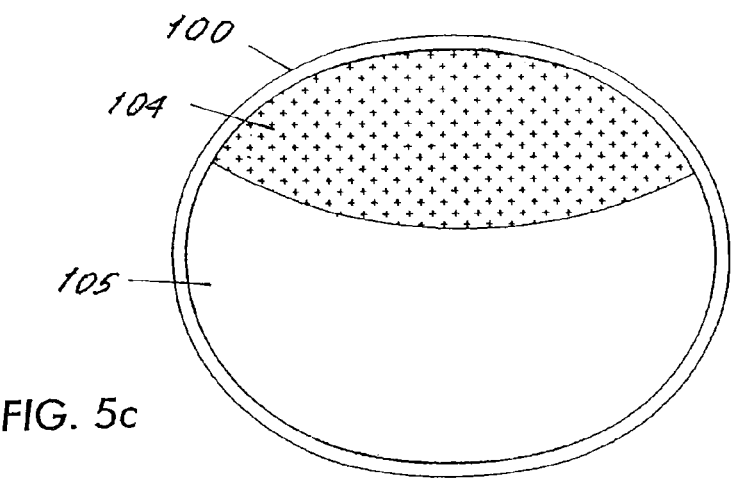
FIG. 5c

VEHICLE MIRROR HAVING A LIGHT SOURCE

CROSS-REFERENCE TO RELATED APPLICATION

This application is based on and claims priority to U.S. Provisional Patent Application Ser. No. 60/786,653, filed on Mar. 28, 2006 and entitled VEHICLE MIRROR WITH ADJUSTABLE REFLECTIVE PROPERTIES, the entire contents of which are hereby incorporated by reference herein.

BACKGROUND OF THE INVENTION

The invention relates to vehicle mirrors and, more particularly, to mirrors whose reflective properties may be adjusted, and to cross-view mirrors with added functionality.

Vehicle mirrors are known in the art and are used in various situations. For example, a rear-view mirror is typically mounted inside of a vehicle with a line of sight designed so as to produce an image for a driver corresponding to objects appearing behind the vehicle. A side-view mirror has a similar function but is typically mounted outside the vehicle on both the driver and passenger sides. Cross-view mirrors are typically used on school buses and possibly on other large vehicles, and are mounted to provide a view of the ground in front of and alongside the vehicle. Cross-view mirrors and other types of vehicle mirrors are shown and described in, for example, U.S. Pat. Nos. 4,436,372; 4,822,157; 4,938,578; 5,084,785; 5,576,899; and 6,328,450—the entirety of the contents of each of which patents is hereby incorporated by reference.

Basically, in large vehicles such as buses, and particularly in the case of a school bus, cross view mirrors are mounted on front fenders of the bus. The cross-view mirror assists the driver in locating children or other pedestrians who may be near the bus. To illustrate the use of such a cross-view mirrors, as shown generally in FIG. 1, a driver 50 of a bus 52 has a line of sight 54 where driver 50 can see objects including traffic and pedestrians. However, when children or other pedestrians 56 are dropped off from bus 52, children 56 may choose to run directly in front of bus 52 or along the side bus 52—both locations being outside the line of sight 54 of driver 50. To avoid harming the children, a cross-view mirror assembly 58 is installed—typically on both the left and right front fenders of bus 52. Cross-view mirror assembly 58 is installed within line of sight 54 and produces a reflected image as so to enable driver 50 to see directly in front of bus 52 and along the side of bus 52, including in the directions 54a which cover the ground and space in front of the bus. A view seen by the driver in one of the cross-view mirrors is provided in FIG. 1a.

Cross-view mirror assembly 58 is comprised of a mirror support 60 and a mirror 62. Mirror support 60 is used to mount mirror 62 to bus 52. As shown in FIG. 2, mirror 62 includes a convex lens 64, a reflecting surface 68, and a non-reflective backing surface 70 adhered to reflecting surface 68, typically just a layer of paint. A support 66, attached to the lens 68, has a fastening mechanism 66a by which the mirror unit can be held by the support 60. Lens 64 may be made of a transparent and rigid acrylic plastic and is therefore, see-through. Reflecting surface 68 may be a metal such as aluminum and non-reflective backing surface 70 may be simply a coat of paint.

Prior art cross-view mirrors do not provide an ability to change the reflective properties of the cross-view mirror reflective surface. Although, some have used tinting for reducing glare from an upper portion of the mirror, such approach may result in the upper surface of the mirror being too dark, particularly during the night hours. The invention is an improvement upon the above described arrangements and structures.

SUMMARY OF THE INVENTION

The object of the invention is to provide cross-view mirrors vehicle mirrors and, more particularly, to provide mirrors whose reflective properties may be adjusted, and to cross-view mirrors with added functionality.

Accordingly, a vehicle mirror according to the present disclosure comprises a mirror unit including a lens, a light transmission layer disposed to receive light from the lens, and to control light transmission through or reflectivity from the light transmission layer; a support for the mirror unit and a lens housing; an energy emitter in the housing for selectively radiating energy at the light transmission layer to control its light transmission; and an electrical control system coupled to an output of at least one sensor which is capable of sensing an environmental parameter, the control system being effective to control the light transmission of the light transmission layer based on the sensor output.

In accordance with further embodiments disclosed herein, the light transmission layer can comprise a photochromic material, or an electrochromic material, or a thermochromic material and/or an LCD material, and the like. The light transmissivity or reflection of this layer can be controlled by sensing such signals as may be received from the vehicle's transmission, from a manual control, from a light sensor, from a door control of the vehicle, and the like.

In accordance with other embodiments of the present disclosure, the control system is effective to control a motor that can adjust the orientation of the mirror lens and/or position a shade over the mirror lens surface.

In accordance with another preferred embodiment, only a selected section or selected sections of the light transmissive layer is controlled to regulate the brightness of an image that may be formed on the mirror lens.

BRIEF DESCRIPTION OF THE DRAWINGS

FIGS. 3a, 3b and 3c show details of the mirror lens of FIG. 3.

FIGS. 5a, 5b and 5c are front views of vehicle mirrors in accordance with various embodiments of the invention.

FIG. 5d is a cross-section through FIG. 5b.

DETAILED DESCRIPTION OF EMBODIMENTS OF THE INVENTION

Figure 1:
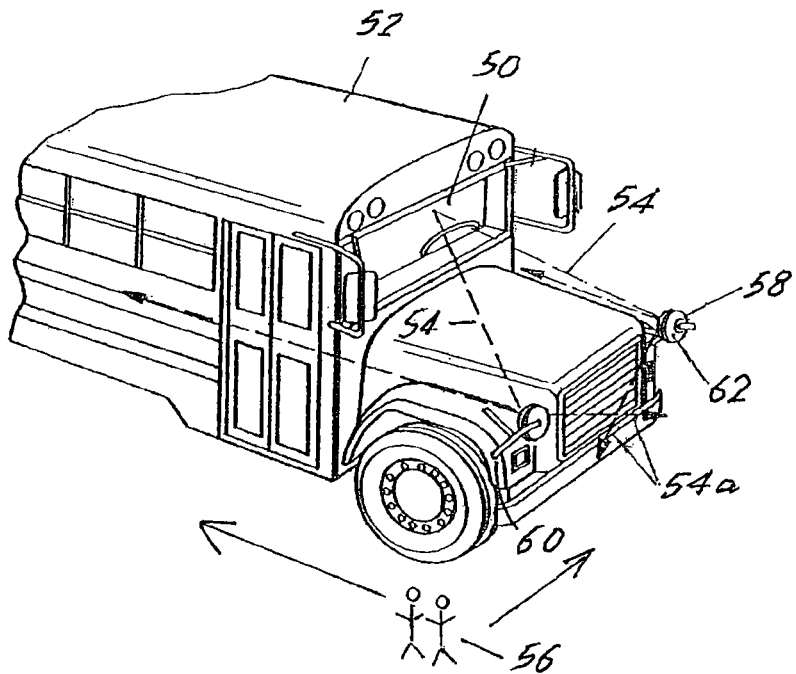
FIG. 1 is a perspective view of a bus with a cross-view mirror assembly in accordance with the prior art.
Figure 1A:
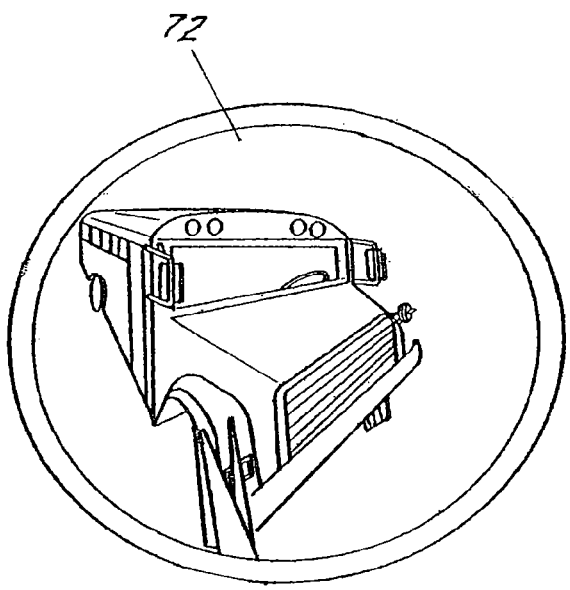
FIG. 1a is a plan view of an image produced by a cross-view mirror in accordance with the prior art.
Figure 2:
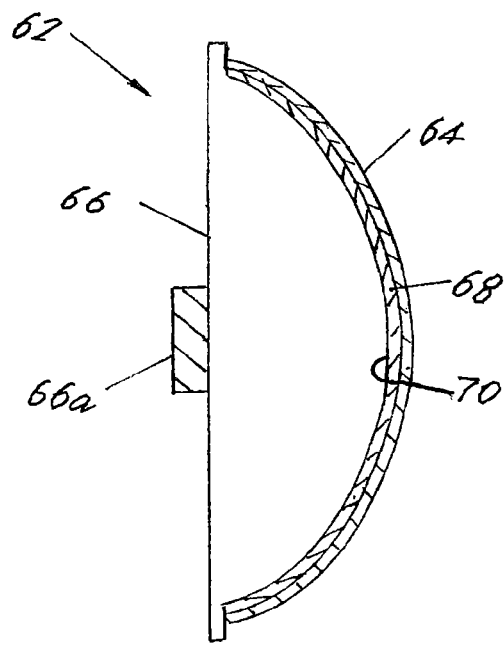
FIG. 2 is a side view of a vehicle mirror in accordance with the prior art.

It has been determined that while prior art mirrors, and in particular cross-view mirrors, are typically fixedly attached to a bus or vehicle, it is not always desirable to have the mirror produce the same reflection or maintain the same orientation. For example, governmental regulations require drivers to utilize the cross-view mirrors, to carefully view the images of the ground area directly in front of and along the side of the bus, but only while the school bus is stopped and is discharging or taking on student passengers. That is the purpose of the conventional cross-view mirror. Conversely, when the bus is moving, such images are much less relevant and/or useful to the driver, primarily because cross-view mirrors produce highly distorted and non-uniformly sized images, particularly of objects located far away. Moreover, portions of the image produced by a conventional cross-view mirror are frequently not very useful. For example, as shown in FIG. 1a, in conventional cross-view mirrors, a reflected image 72 of the bus, per se, takes up a large portion of the image produced by the mirror. A reflected image of the bus may be of little use to a driver. Also, depending on the azimuth angle of the sun and whether the bus is driven in day or night, certain sections of the cross-view mirror might produce distracting and useless reflections.

Figure 3:
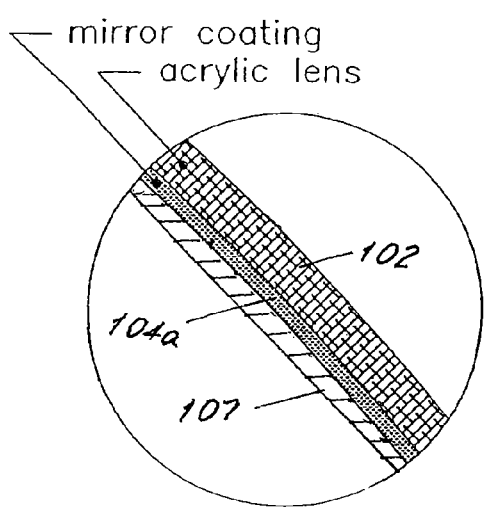
FIG. 3 is a line drawing of a vehicle mirror in accordance with an embodiment of the invention, including a control circuit therefor.
Figure 3:
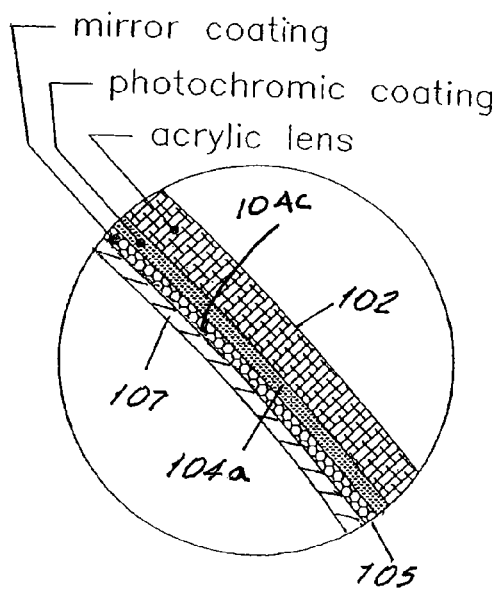
Figure 3:
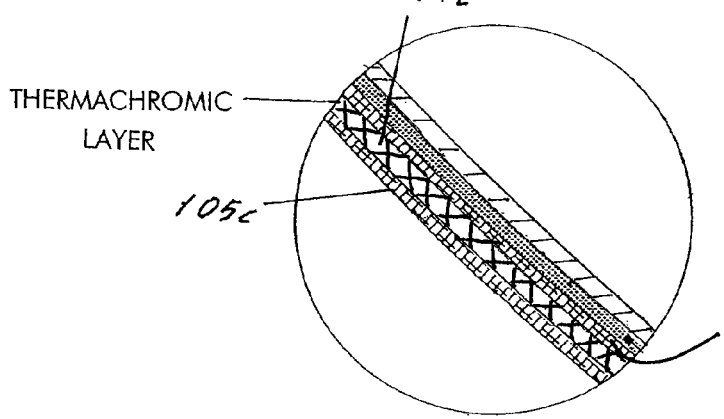
Figure 3:
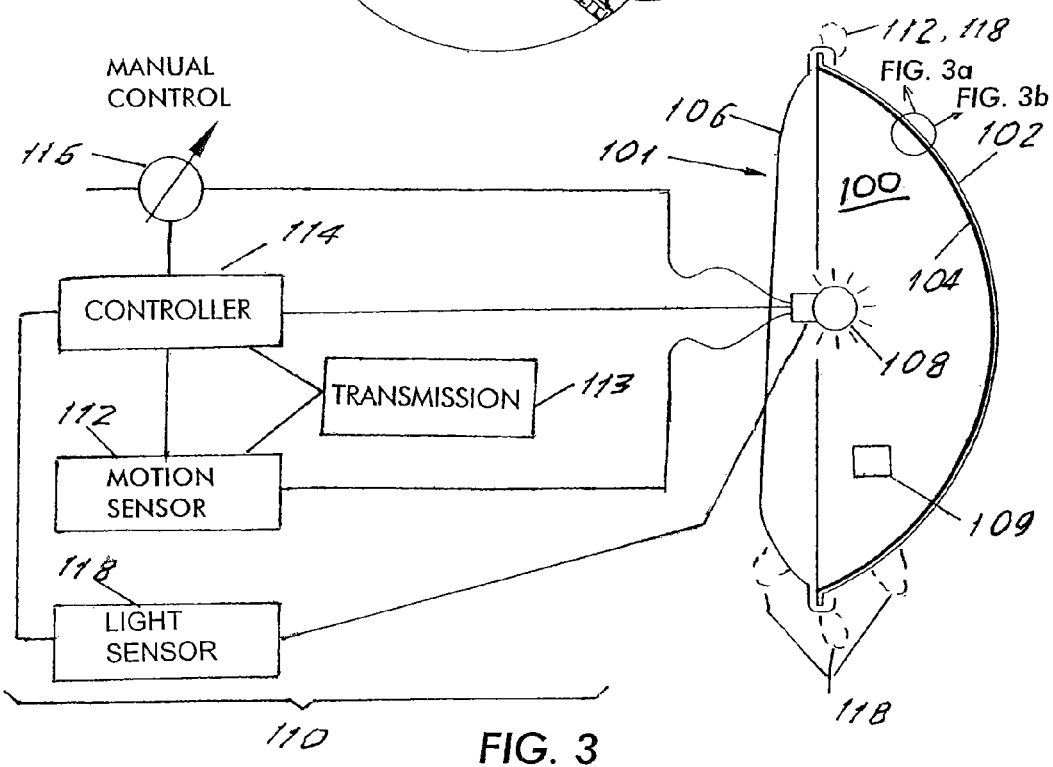

Referring to FIG. 3, there is shown a mirror 100 in accordance with an embodiment of the invention. Mirror 100 includes an acrylic lens 102, a mirror coating 104 disposed so as to receive light from lens 102, and a lens support 106. The mirror coating 104 typically consists of several layers of different materials. Its essential purpose is to reflect back light rays that strike the mirror coating 104 and passing through the acrylic lens 102 in order to create the image. One of the constituents of the mirror coating 104 has a light transmissivity which can be altered in response to a stimulus and thereby dim the entire lens surface or, more preferably, selected sections thereof in accordance with specifically determined criteria. For example, the layer that has a changeable light transmissivity may be responsive to ultraviolet light or, alternatively, to ordinary light, or in accordance with yet another alternative to heat, i.e., temperature, or to an electrical voltage or current that is applied directly to that layer.

Turning to FIG. 3a, the mirror coating 104 may include a light controlling coating 104a constructed of a material that is sensitive and responsive to a particular stimulus to change its opacity. For example, the coating 104 may comprise a photochromic coating 104a whose light transmitting properties vary in response to being impinged by ultraviolet ("UV") light, such as UV light produced by a lamp 108 shown in FIG. 3. Coating 107 may be a paint coating provided to protect the photochroming 104a, and is of the type that does not block the UV light. In the embodiment of FIG. 3a, the photochromic coating 104a not only controls the light transmission, but also acts as a reflector that reflects the light that is not transmitted through the acrylic lens 102 to produce a dimmed image at the locations where the coating 104a is provided.

In the embodiment of FIG. 3b, a metalizing layer 104c is provided behind the photochromic coating 104a to produce the reflections, i.e., the image seen by the driver. The protective layer 107 protects the metalized reflecting surface 104c.

The controllable light transmissive layer 104a may, alternatively, be comprised of a material which is responsive to other types of electromagnetic energy, such as energy in the visible light spectrum or infrared energy, or simply to heat. The primary function of the layer 104a is to reduce the amount of light that passes through and eventually reflected to form the image transmitted through the acrylic lens back to the driver.

As such, it will be appreciated that the layer 104a can be provided, if desired, on the front side of the acrylic lens. Regardless, since the layer 104a has the property whereby the light transmissivity thereof may be altered by being exposed to ultraviolet and other sources of electromagnetic radiation, or even by being connected directly to an electrical signal, as is possible with LCD based devices, the light reflection intensity of the lens can be controlled.

Moreover, it is not necessary that the entire lens 102 is coated with the controllable light transmissive material. Only a section thereof may be covered, as shall be described. Alternatively, several different sections may have the coating and the different sections controlled independently of one another.

The technology of the light controllable transmissivity of the coating 104a, i.e., its physical and material properties, need not be described herein in detail. Suffice it to note that such materials are known in the art, including as described in U.S. Pat. No. 5,708,522 and also in U.S. Pat. No. 6,700,692, the contents of both of these patents being incorporated herein by reference.

In accordance with one understanding of the technology of photochromic coatings, such coatings include a plurality of molecules of substances such as silver chloride or silver halide embedded therein. In the absence of exposure to UV light, the molecules are transparent to visible light and coating 104a has virtually no light absorption, i.e., a maximum light transmissivity.

In this state, light entering through lens 102 passes through coating 104a virtually unaltered, travels to reflective material 104c (FIG. 3b) and then back through lens 102, again without being significantly altered or attenuated. However, when photochromic coating 104a is exposed to ultraviolet light, such as from light source 108, the molecules in coating 104a undergo a chemical process and change shape thereby blocking light from passing through, in dependence on the intensity of the UV light. With these molecules thus altered, light passing through lens 102 is attenuated by coating 104a, the attenuated light is reflected by reflective coating 104c, attenuated again by coating 104a, and then sent out through lens 102. The attenuation could yield a partial or complete attenuation of the intensity of light 101 entering lens 102 so that no light is reflected outward.

The reflectivity of the mirror coating, i.e., the light absorption of photochromic coating 104a, is affected, as noted, by UV light 108. Light 108, in turn, may be controlled by a control system 110. Control system 110 may include one of a light sensor 118, a motion sensor 112, a manual control 116, a controller 114, or combinations of these elements and the like.

In the embodiment of FIG. 3c, the light attenuating coating 104 may be constituted of a thermochromic optical layer 104e, for example, of the type described in U.S. Pat. No. 5,525,430, the full contents of which are incorporated herein by reference. The thermochromic layer in this embodiment has conductors 105c which may be heated by passing an electrical current therethrough to change its characteristics from becoming substantially transparent to less transparent to opaque.

Thus, when the school bus is stopped to pick up or discharge students, the thermochromic layer 104e is not heated and the full reflectivity of the mirror is obtained over all its sections to obtain the brightest images from the mirror. However, when the bus begins to move, an internal heater 134 connects to the conductors 105c attached to the thermochromic layer 104e and the upper portion or the central portion of the mirror can become darkened. When the bus arrives at the next stop, the heater is immediately shut off and, moreover, a cooling fan 109 blowing ambient air rapidly restores the temperature of the layer 104e so that the mirror provides full light transmissivity.

For certain types of thermochromic layers which work in the a reverse mode whereby heating of the layer makes its material more light transmissive, the control mode is simply reversed. Normally, the layer is heated to obtain the maximum reflection from the mirror lens and as soon as the vehicle starts moving, the heater shuts down and the fan is activated to darken sections of the mirror.

As described above, the present invention teaches a mirror that darkens with heat input, as opposed to UV light. The heat threshold for darkening can be selected by choosing the appropriate chemistry of the thermochromic dye.

The bus motion sensor 112 may be disposed at any location. Motion sensor 112 may be used to detect motion of the bus, for example, that the bus is moving at a speed greater than 10 miles per hour and output motion signals in response, to cause the light 108 to dim the entirety or selected portions of the mirror surface.

Bus motion sensor 112 or controller 114 could be connected to a transmission 113 of a vehicle so to control and activate light 108 only when the vehicle transmission is not in "PARK". Or the transmission state may be used to control the motion sensor 112 to turn on to detect motion only when the vehicle is in not in park or is moving slowly. Alternatively, motion sensor 112 may always be enabled but controller 114 may determine how to process information in motion signals received from motion sensor 112 based on signals received from transmission 113.

Similarly, light sensor 118 may be used to detect a level of light near mirror 100 and output light signals in response. Light sensor 118 may be disposed at various locations on mirror 100 including on lens 102, or on support 106 as is shown in dotted lines. Light sensor 118 may be disposed at a plurality of locations on support 106 such as, for example, at both a top portion and bottom portion of support 106. In this way, if a light sensor 118 disposed at a top portion of support 106 detects a large level of light, such as from sun light, controller 114 may darken or lessen the reflectivity of a portion of an upper portion of mirror 100. The ability to affect the reflectivity of a portion of a mirror is discussed in more detail below. Similarly, if light sensors 118 disposed at both a top and bottom portions of support 106 both detect a large level of light, controller 114 may be used to darken or lessen a reflectivity of all or most or selected portions of mirror 100.

As with the discussion of motion sensor 112, controller 114 optionally receives signals from both light sensor 118 and transmission 113 so that an output by controller 114 may be based on both inputs. For example, when the vehicle is not moving or the transmission is in park, if a light sensor 118 disposed on a top portion of support 106 detects a high level of light, controller 114 may darken an upper portion of mirror 100. However, if the vehicle is moving so that it is not necessary to check for children running in front or alongside the school bus, such light detection may be less relevant or not necessary and the controller 114 may be programmed to keep the upper portion or even the entire mirror 100 darkened or not reflecting until the vehicle's transmission is in park again. Clearly, although controller 114 is shown and described, light sensor 118 and motion sensor 112 may each be used to directly control the reflectivity of mirror 100. Manual control 116 may be used by a driver to manually affect the reflective properties of mirror 100—for example, through light 108. The operation or output of motion sensor 112 or light sensor 118 may also be affected by a time of day which may be determined by controller 114.

Figure 4A:
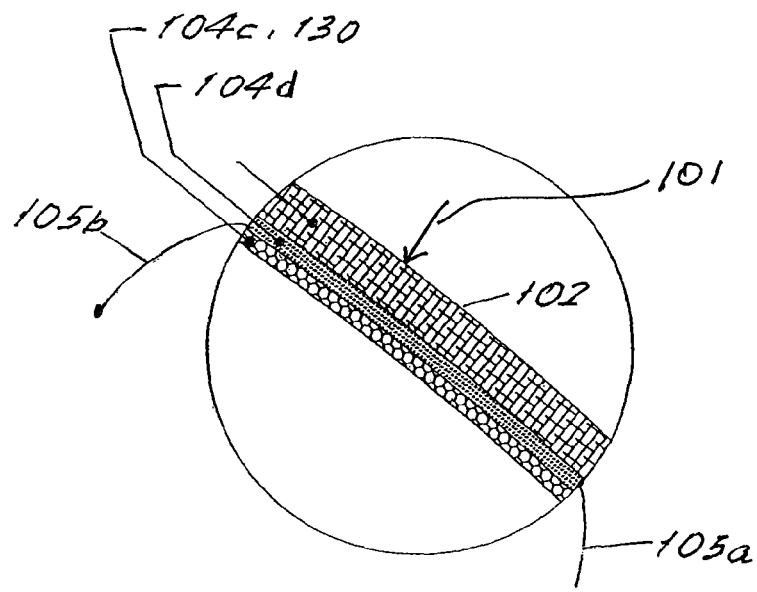
FIG. 4a is an exploded view of a portion of the mirror lens, in accordance with the embodiment of the invention shown in FIG. 4.
Figure 4:
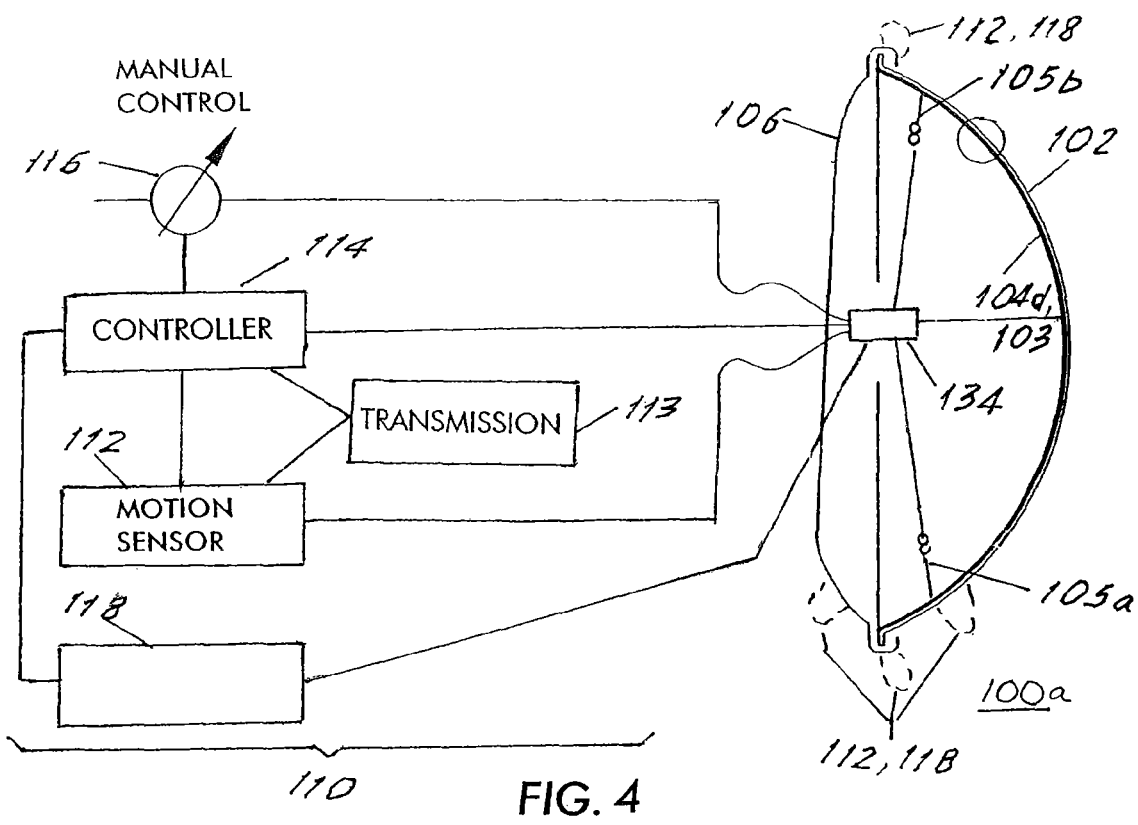
FIG. 4 is a line drawing of a vehicle mirror.

Referring to FIG. 4 and FIG. 4a, control system 110 may be used to control mirror 100a in accordance with an embodiment of the invention. As with mirror 100, mirror 100a includes a support 106 and a lens 102. Here the controlled light transmitting coating 104 includes a liquid crystal display ("LCD") or an electrochromic coating 104d may be used in front of a reflective coating 104c. LCDs are known in the art. Basically, LCDs include molecules suspended between electrodes and polarizing filters. By selectively applying an electric charge to these molecules, varying levels of light may be allowed to pass through the filters. In an electrochromic coating, light 101 passing through the electrochromic coating may be attenuated if an electric charge is applied to the coating. In the embodiment shown in FIG. 4, control system 110 is connected to an electric charge source 134 so that an output of control system 110 may be used to drive electric charge source 134 and, consequently, selectively darken portions of LCD 104d. If LCD/electrochromic coating 104d is darkened, light 101 incident thereon may be attenuated before passing through. The LCD layer may have electrodes 105a and 105b, to electrically couple to the source 134.

As described more fully below, different areas of the mirror can be treated with different thermochromic dyes to get variable darkening with different circumstances, such as more darkening at the top of the mirror when exposed to sunlight, and less darkening at the bottom of the mirror when exposed to headlamp glare striking the mirror from behind the bus.

Therefore, multiple heaters or a single heater with multiple circuits can be affixed to the lens of the mirror to be activated individually based on a source of the glare, i.e., if the glare is coming from the headlamp, then only activating the heater/circuit at the bottom or middle of the mirror to darken, and if the glare is coming from the top portion of the mirror, activating the upper heater to darken the top. If the mirror needs to be defrosted, all of the heaters may be activated. Alternatively, the thermochromic characteristics can be chosen such that the threshold for switching between a transmissive layer and an opaque layer is far higher than that needed to only defrost the mirror during cold winter weather.

Light sensors (photocells) can be placed at the top of the mirror to detect sun glare and activate the heaters for upper darkening, as it relates to sun glare. Light sensors (photocells) can be placed near the bottom of the mirror to deflect glare from headlamps striking from behind the vehicle and to activate the heaters for lower or central darkening related to headlamp glare.

As already described, the mirror/heater circuit can be connected to the headlamp circuit on the bus to automatically activate the headlamp glare darkening heater when the headlamps of the vehicle are turned on.

Referring to FIG. 5a, the various, previously described mirror coatings 104, e.g., the photochromic coating, or LCD, or electrochromic, or thermochromic coating, may be applied to, or used, on an entire portion of a mirror 100 as is shown in FIG. 5a. In this way, the reflectivity of the entire mirror 100 may be controlled. Alternatively, as shown in FIGS. 5b and 5c, any of coatings 104 may be applied to only selected portions of mirror 100 so that the reflectivity of those portions of the mirror may be controlled. Remaining portions 105 of the mirror 100 may be always reflective (for example, including a conventional reflective coating) or never reflective.

For example, as shown in FIG. 5b, one coating 104 may be applied to a central portion 111 of a mirror, and a different section 113 of coating 104 also applied, so that the sections 111 and 113 could be independently controlled or controlled to different degrees. This may be particularly useful in handling the problem where the vehicle itself occupies the predominant image in the center of the mirror. By coating the central portion 111 of the mirror with coating 104, and then selectively affecting the reflectivity of that portion of the mirror, the image of the vehicle may be darkened in comparison with other portions of the mirror. This should result in the images from the mirror section 115 becoming the sharpest and brightest images, which is helpful because, as evident from FIG. 1a, the section 115 is where children running in front of the bus are most likely to appear.

As another example, as shown in FIG. 5c, only a top portion of the mirror may include coating 104. In this way, sun glare reflecting into a driver's eyes may be minimized by selectively darkening or minimizing reflections from the top portion of the mirror. Other arrangements for selective coating may also be used. For example, only a left or right side of a mirror may be coated. In the case of LCD 104c, even if the entire mirror is covered by LCD 104c, any portion of mirror 100a may be selectively dimmed or lightened so as to maximize or minimize an amount of light reflection or light attenuation.

In accordance with another embodiment, the invention dispenses with the use of any control system and does not use any reflective surface whose light transmission properties are controllable. Rather, instead of the reflecting surface section 113 described relative to FIG. 5b, the invention uses a metalizing layer which is screened to various degrees along different portions of the mirror surface. That is, the metalizing layer 105 has one section 105a which is formed in the conventional manner to provide maximum reflectivity along a lower section of the mirror. At a central section, the metalizing layer 105 is dotted with small gaps in the form of small circles where no material is provided to reduce reflectivity. That section is provided at a center portion of the mirror. The protective non-reflective layer may use white or gray or any lighter color paint. Along an upper arc of the mirror, a larger-sized screening 105c is provided to dim the image even further. In the mirror shown in FIG. 5c and FIG. 5d, the sharpest images are provided at the bottom arc 105a of the mirror with a less reflective portion at the center and even further less reflective at the top of the mirror. As another alternative, the front surface of the mirror can be abraded at selected sections (or polarized) to reduce light glare.

Figure 6:
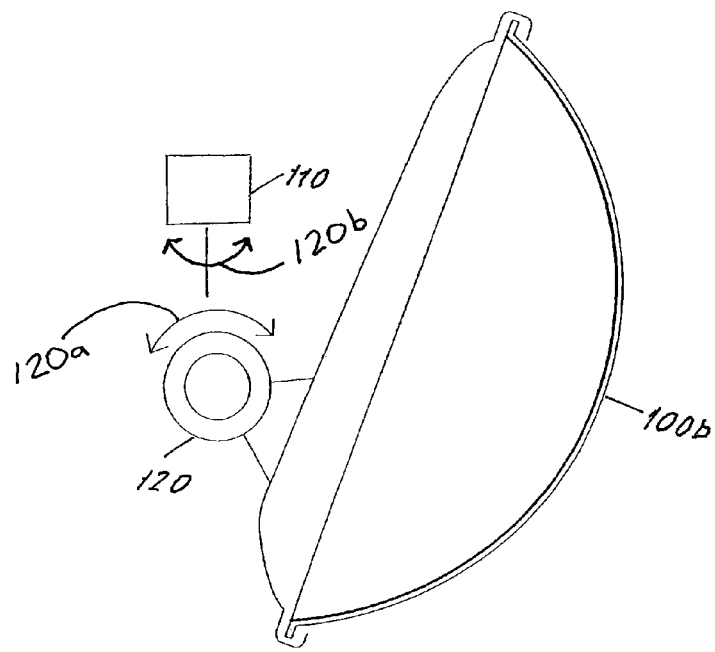
FIG. 6 is a line drawing of a vehicle mirror in accordance with another embodiment of the invention.

Control system 110 may also be to used to control an orientation of mirror 100. For example, referring to FIG. 6, control system 110 may be used to control a motor or other mechanical means 120 to alter an orientation of the mirror unit along arrows 120a and 120b. For example, motor 120 can control a pan (left to right orientation) or tilt (up to down orientation) of mirror 100b or alter a distance between the mirror and a driver. In this way, the light reflected by the mirror may be altered. The bus motion sensor may be utilized such that the mirror 100 is automatically controlled to assume one position and orientation when the bus is taking on or discharging students and a different position when the bus is on route to the next stop. Note, the controller is programmed to ignore temporary stops, such as at the red signals, stop signs, stop and go traffic, etc.

Figure 7:
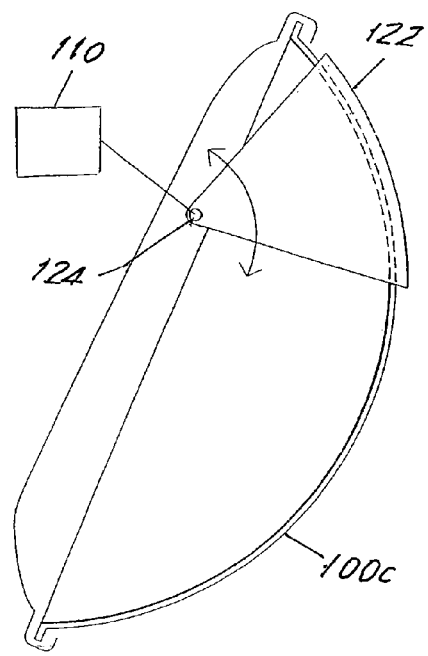
FIG. 7 is a side view line drawing of a vehicle mirror in accordance with a further embodiment of the invention.

Referring to FIG. 7, control system 110 may be used in connection with another mirror 100c. Mirror 100c may (but need not) include any one of the previously described coatings 104. Mirror 100c may include an adjustable screen 122 controlled by control system 110 through a motor or other mechanical means 124. Control system 110 may control motor 124 to move screen 122 up or down so as to reduce an amount of light reflected by mirror 100c. For example, light sensor 118 (FIG. 3) or controller 114 (FIG. 3) of control system 110 may measure a level of ambient light and control the position of screen 122 through motor 124.

Figure 8:
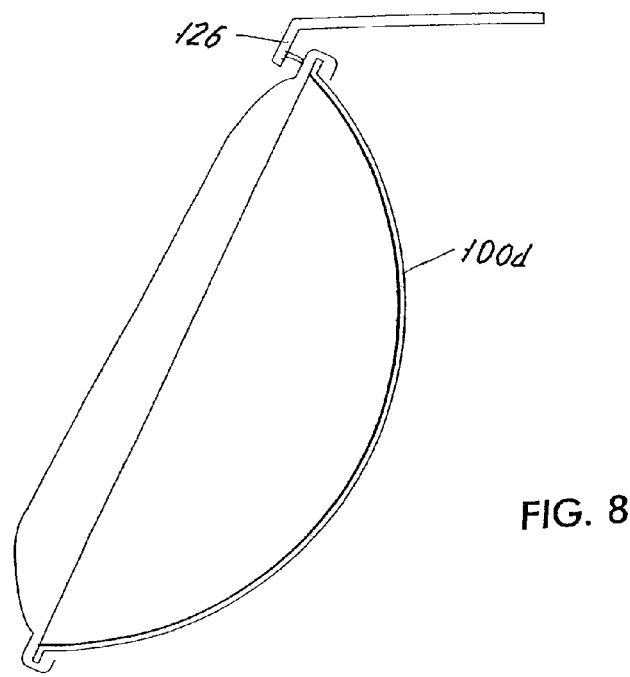
FIG. 8 is a side view line drawing of a vehicle mirror in accordance with another embodiment of the invention.

Referring to FIG. 8, light reflected by a mirror may also be controlled through the use of a stationary shield 126 on a mirror 100d. The shape of the shield may be flat as shown, or curved toward the surface of the mirror. The Mirror 100d may also optionally use any one of coatings 104.

Referring to FIGS. 3-7, control system 110, including controller 114, may be designed with preset positions or selective darkening regions or levels for any one of mirrors 100. For example, when a signal is received from a transmission 113 indicating that the vehicle is in "park", or otherwise not moving, control system 110 may control light 108 or electric charge source 134 to modify the reflection characteristic of mirror 100, or vice versa. Similarly, mechanical members 120 or 124 may be controlled. When a signal is received from transmission 113 indicating that the vehicle is moving, a different preset may be used to affect the reflection of mirror 100, position of mirror 100 or position of shade 122.

Motion sensor 112 may output detected motion signals to a controller 114. Controller 114, in turn, may be used to control light source 108. If the bus is stopped, the controller 114 enables mirror 100 to fully reflect light 101 and respective coatings 104a, 104b should be adjusted accordingly.

Figure 9:
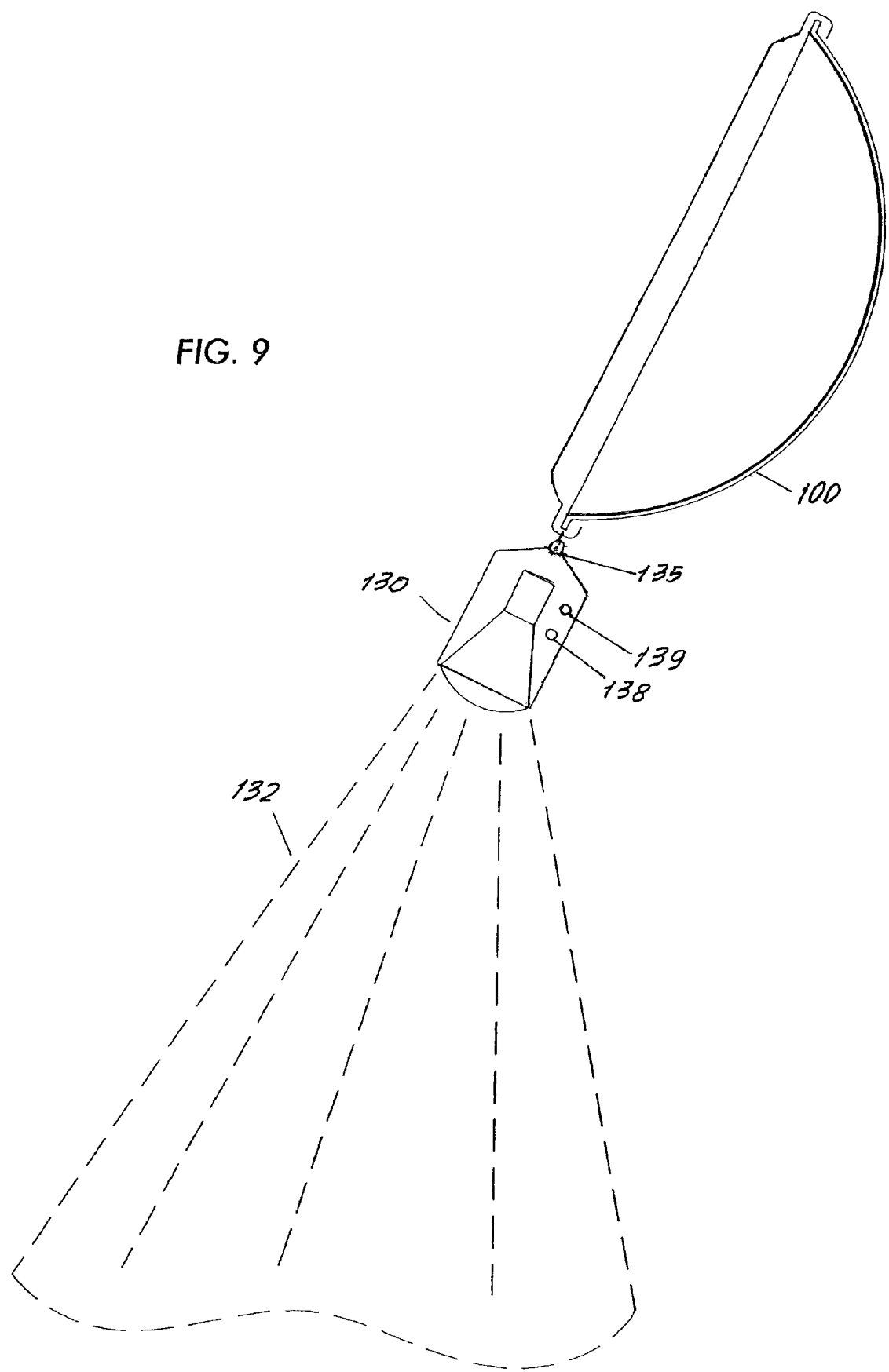
FIG. 9 is a side view line drawing of a vehicle mirror in accordance with a further embodiment of the invention.

Referring to FIG. 9, any one of mirrors 100 could also include a look-down lamp 130. Look-down lamp 130 could be mounted on a swivel support 135 of mirror 100 or on any other portion of mirror 100, to generate an illumination field of view 132 for mirror 100. The lamp 130 may be manually or automatically or driver adjustable so as to best light the space in front of and/or alongside the school bus, and may be comprised of several lamps. Thus, the swivel support may be motor controlled. As with many of the embodiments discussed herein, mirror 100 with look-down lamp 130 provides further enhanced safety features for mirror 100.

Further referring to FIG. 9, the housing for the lamp 130 may also support a movement sensor 138 which is located to detect children moving in front of or alongside the bus. As soon as any motion of this type is detected, the housing may flash a signal through a lamp 139 or the element 139 may also incorporate a buzzer or the like to alert the driver of such movement independently of any image which the driver may or may not see in the mirror. This feature provides added protection against accidentally running over students, so as not to rely entirely on visual inspection of the images on the mirror 100. Moreover, the movement sensor 138 may be coupled to the controller 110 of the previously described embodiments and that controller may actually show an indication of such child movements in the mirror itself through apertures in the mirror surface containing appropriate visual indications of such movement. Preferably, a very strongly colored bulb may be provided in a portion of the mirror such as to provide the driver with a strong visual indication even in very bright sunlight.

With further reference to FIGS. 5a, 5b, 5c and 5d, as well as FIGS. 3a, 3b, 3c and 4a, one of ordinary skill in the art would immediately recognize that photochromic, thermochromic and other materials which form the light transmission layer might be affected directly through sunlight or intense light of other vehicle's headlamps to change their light transmission properties without any need for a special UV lamp or a light lamp or the like. Therefore, the entire one-third or one-half or majority of the top portion of the mirror surface may be formed with the special coating of light transmission layer and that coating will respond to direct sunlight to dim the local area where the sunlight is striking or where headlights are impinging to dim the very specific portions that are being struck by the sun's UV energy or the concentrated light from the headlights of another vehicle. Therefore, only those portions of the mirror surface which are reflecting light from the sun or from headlamps will be dimmed, as well as small portions around them which will naturally be impacted by those UV or light sources naturally, although to a different lower degree, which is, in fact, advantageous.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vehicle mirror comprising:
    a mirror assembly comprising a mirror unit and a support for the mirror unit, wherein the mirror unit provides a field of view for a driver of the vehicle; and
    a light source mounted to the mirror assembly and configured to illuminate the field of view provided by the mirror unit, and
    a sensor mounted to the light source for detecting movement in front of the vehicle or to a side of the vehicle.

2. The vehicle mirror of claim 1, wherein the light source is mounted to the mirror unit of the mirror assembly.

3. The vehicle mirror of claim 1, wherein the light source is mounted to the support for the mirror unit of the mirror assembly.

4. The vehicle mirror of claim 1, wherein the light source comprises a plurality of lamps.

5. The vehicle mirror of claim 1, wherein an orientation of the light source is automatically adjustable to illuminate the field of view provided by the mirror unit.

6. The vehicle mirror of claim 1, wherein an orientation of the light source is manually adjustable by the driver of the vehicle to illuminate the field of view provided by the mirror unit.

7. The vehicle mirror of claim 1, further comprising a motor for controlling adjustments to an orientation of the light source.

8. The vehicle mirror of claim 1, wherein the vehicle is a school bus, and wherein the illuminated field of view is an area in front of the school bus.

9. The vehicle mirror of claim 1, wherein the vehicle is a school bus, and wherein the illuminated field of view is an area to a side of the school bus.

10. The vehicle mirror of claim 1, further comprising an element mounted to the light source for providing an alert to the driver of the vehicle in response to the detection of movement by the sensor.

11. The vehicle mirror of claim 10, wherein the element provides a visual alert to the driver of the vehicle in response to the detection of movement by the sensor.

12. The vehicle mirror of claim 10, wherein the element provides an audible alert to the driver of the vehicle in response to the detection of movement by the sensor.

* * * * *